United States Patent [19]

Wesselmann

[11] 4,426,826
[45] Jan. 24, 1984

[54] SELF-PROPELLED HARVESTER FOR SUGAR CANE

[75] Inventor: Winfried Wesselmann, Warendorf, Fed. Rep. of Germany

[73] Assignee: Claas Ohg, Harsewinkel, Fed. Rep. of Germany

[21] Appl. No.: 367,964

[22] Filed: Apr. 13, 1982

[30] Foreign Application Priority Data

Apr. 22, 1982 [DE] Fed. Rep. of Germany ....... 3115924

[51] Int. Cl.³ .......................................... A01D 45/10
[52] U.S. Cl. ..................................... 56/13.3; 56/13.9; 56/16.5
[58] Field of Search ...................... 56/13.9, 13.3, 16.5, 56/10.2

[56] References Cited

U.S. PATENT DOCUMENTS 3,599,404  8/1971  Fernandez ........................... 56/16.5
3,925,199 12/1975  Quick .................................. 56/16.5
4,147,017  4/1979  Cortopassi .......................... 56/16.5
4,364,222 12/1982  Ramacher ........................... 56/13.3

FOREIGN PATENT DOCUMENTS 7608053  1/1978  Netherlands ........................ 56/16.5

Primary Examiner—Jay N. Eskovitz
Attorney, Agent, or Firm—Michael J. Striker

[57] ABSTRACT

A self-propelled sugar cane harvester has a picking and comminuting device, an inclined conveyor, a discharge conveyor transversely inclined conveyor, a pressure fan located in the region of an outlet end of the inclined conveyor to direct an air stream through a comminuted sugar cane stream, and an additional suction fan arranged to provide for a uniform air stream in the region of transition between the inclined conveyor and the discharge conveyor and in an inlet region of a discharge hood.

6 Claims, 1 Drawing Figure

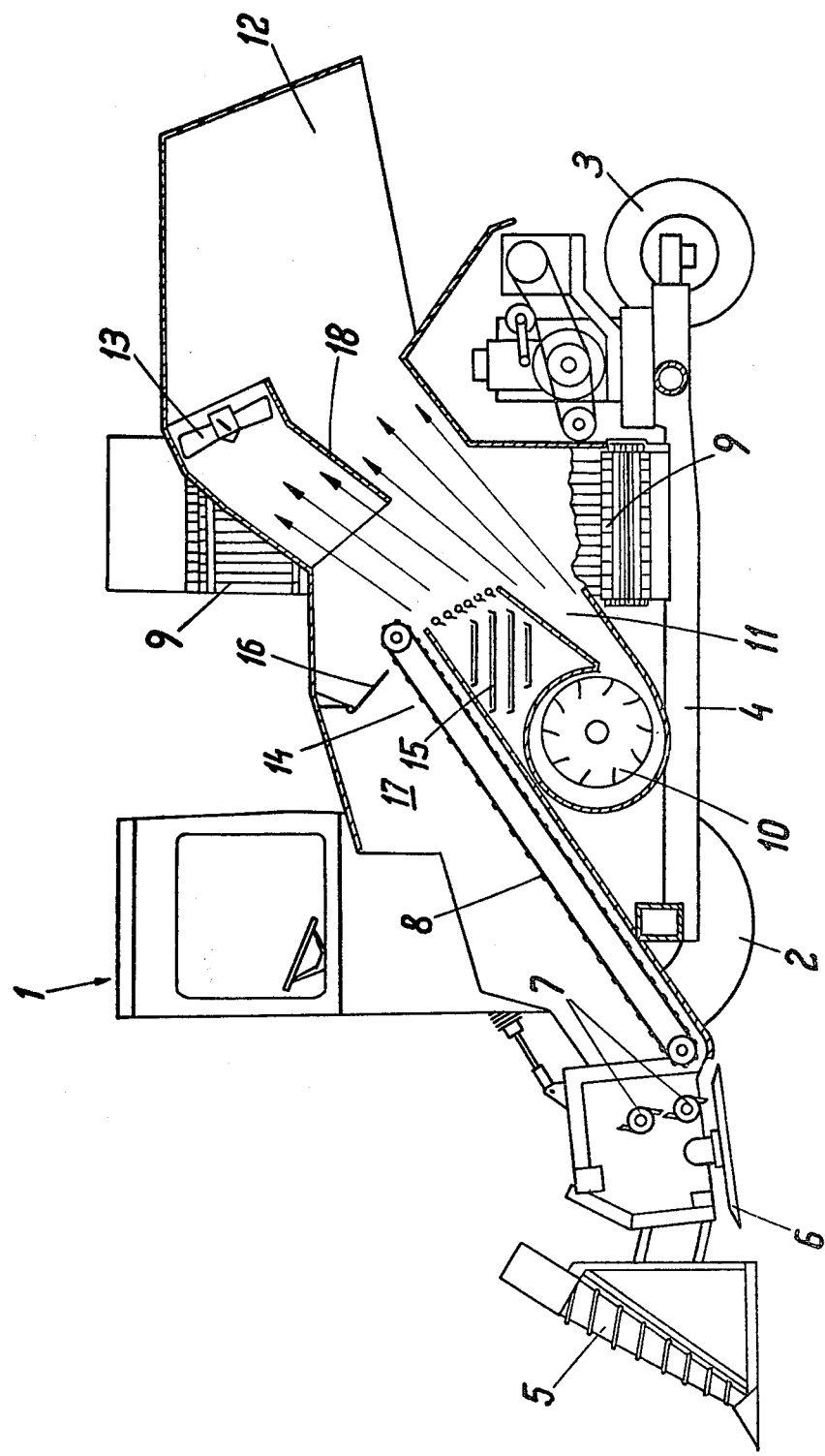

SELF-PROPELLED HARVESTER FOR SUGAR CANE

BACKGROUND OF THE INVENTION

The present invention relates to a self-propelled harvester for sugar cane.

Self-propelled harvesters for sugar cane are known in the art. A known self-propelled harvester has a front aspirating or picking means for feeding sugar cane into the machine, comminuting meanns for comminuting the sugar cane, an inclined conveyor, an ascending discharge conveyor extending normal to the inclined conveyor and arranged so that a stream of the comminuted sugar can fall from the inclined conveyor onto the discharge conveyor, and a pressure fan located in the region of transition between the conveyors so that its air stream is directed through the stream of comminuted sugar cane toward a discharge hood. The pressure fan in the housing of the machine cannot in many cases remove all leaf particles from the product stream. Because of this, a suction conveyor forming so-called secondary cleaning is provided at the upstream end of the discharge conveyor to aspirate residual leaf particles and other impurities from the product stream before throwing the comminuted sugar cane to a following vehicle. The thus aspirated particles are freely blown outwardly into the air. The disadvantage of this construction is that the leaf particles and other blown impurities "rain down" on the standing sugar cane and the harvester itself. A further disadvantage of this construction is the fact that it is necessary to provide the relatively heavy suction fan because of its arrangement at the outer end of the discharge conveyor which laterally extends outwardly of the harvester and undesirably affects the location of the center of gravity.

SUMMARY OF THE INVENTION

Accordingly, it is an object of the present invention to provide a harvester for sugar cane which avoids the disadvantages of the prior art.

More particularly, it is an object of the present invention to provide a sugar cane harvester which is characterized by improved cleaning of the harvest and location of the center of gravity of the machine, and substantially avoids failures and loading by aspirated leaf fractions and impurities.

In keeping with these objects, and with others which will become apparent hereinafter, one feature of the present invention resides, briefly stated, in a self-propelled sugar cane harvester having picking and comminuting means with a first and second transporting means and a pressure fan therebetween, wherein an additional suction fan is arranged to provide for a uniform air stream in the region of transition between the first and second transporting means.

As in conventional sugar cane harvesters, the transporting means are formed by an inclined conveyor, and an ascending discharge conveyor extending normal to the inclined conveyor. More particularly, the suction fan is located in an inlet region of the discharge hood.

When the sugar cane harvester is designed in accordance with the present invention, it eliminates the above mentioned disadvantages and provides for the above mentioned highly advantageous results.

In accordance with another feature of the present invention, air guiding means is arranged in the interior of the discharge hood and formed as an air guiding wall located in the inlet region of the discharge hood under the suction fan and extending through a cross section of the discharge hood.

A further feature of the present invention resides in the fact that a space above the first transporting means or the inclined conveyor is subdivided in the region of its outlet end by a sealing flap which may be swingably suspended in this space.

Still a further, especially advantageous feature of the present invention is that the flap is arranged so that it senses loading conditions of the inclined conveyor and actuates the suction fan in dependence upon the thus sensed loading condition of the inclined conveyor.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is a schematic lateral view of a harvester for sugar cane, in accordance with the present invention.

DESCRIPTION OF THE PREFERRED EMBODIMENT

A harvester for sugar cane in accordance with the invention is identified in toto by reference numeral 1. It has a front driving axle 2 and a rear guiding axle 3. Both axles 2 and 3 support a base frame 4 on which parts of the machine are assembled.

During harvesting, standing sugar cane is first divided by a stalk divider 5 and then cut by two cooperating cutter disks 6. The cut sugar cane is comminuted by a pair of chaff rollers 7 arranged after the cutter disks 6 and fed onto an inclined band conveyor 8. The comminuted pieces of sugar cane which are mixed with leaf particles fall from the conveyor 8 onto a discharge band conveyor 9 which is arranged transverse to the conveyor 8 and is also inclined in ascending manner.

In order to separate the pieces of sugar cane from the leaf particles and other impurities, a pressure fan 10 is arranged under the inclined conveyor 8 and more particularly in its outlet region. A funnel 11 of the pressure fan 10 is directed toward a discharge hood 12. Air exiting from the funnel 11 passes subsequently through the product stream falling from the inclined conveyor 8 onto the discharge conveyor 9. Thereby light particles are blown out of the product stream, and only comminuted sugar cane falls onto the discharge conveyor 9.

In the event that the field was burnt prior to harvesting and therefore only a very small leaf fraction is in the harvest, the above described cleaning is sufficient. This is however not true for the case when the leaf fraction in the product stream is considerably higher. In order to provide for an effective cleaning in the latter case, a suction fan 13 is arranged in the inlet region of the discharge hood 12. The suction fan 13 supports the action of the pressure fan 10.

An air quantity required for the suction fan 13 flows through air slots 15 provided in lateral walls 14 of the machine. By the joint air stream produced by the pressure fan 10 and the suction fan 13, the leaf particles and other impurities are intentionally ejected through the discharge hood 12 behind the machine onto the field. Dirtying of the machine or the standing sugar cane and/or the harvested product discharged from the conveyor 9 onto a following vehicle no longer takes place.

As can be seen from the drawing, a sealing flap 16 is associated with the inclined conveyor 8 in a space behind the latter. The sealing flap 16 limits aspiration of "false air" from the space 17 above the inclined conveyor 8. The flap 16 can simultaneously serve for sensing the loading condition of the conveyor 8 and switching the suction fan 13. The flap 16 can be connected by known means with actuating elements of the suction fan 13.

A transverse wall 18 is further arranged in an inlet region of the discharge hood 12 and extends through the cross section of the hood. The transverse wall 18 is provided for obtaining an optimum action of the pressure fan 10 and suction fan 13.

It will be understood that each of the elements described above, or two or more together, may also find a useful application in other types of constructions differing from the types described above.

While the invention has been illustrated and described as embodied in a harvester for sugar cane, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A self-propelled sugar cane harvester, coomprising picking means arranged to pick sugar cane; comminuting means arranged to comminute the same; first transporting means arranged to transport the comminuted sugar cane and having an outlet from which the comminuted sugar cane is discharged; second transporting means arranged to further transport the comminuted sugar cane and locatted near said outlet end of said first transporting means so that a stream of the comminuted sugar cane falls from said first transporting means onto said second transporting means in the region of transition between said first and second transporting means; a discharge hood having inlet and outlet; a pressure fan element located in the region of said outlet end of said first transporting means so that an air stream from said pressure fan element is directed through the comminuted sugar cane stream; an additional suction fan element arranged in said inlet of said discharge hood so as to provide for a uniform air stream in the region of transition between said first and second transpoting means; and air guiding means including an air guiding wall located in said inlet of said discharge hood under said suction fan element and extending through a cross section of said discharge hood.

2. A sugar cane harvester as defined in claim 1, wherein said first transporting means includes an inclined conveyor, said second transporting means including an ascending discharge conveyor.

3. A sugar cane harvester as defined in claim 1; and further comprising wall means arranged to form a space above said first transporting means in the region of said outlet end, and means for subdividing said space.

4. A sugar cane harvester as defined in claim 3, wherein said subdividing means includes a sealing flap arranged in said space above said first transporting means.

5. A sugar cane harvester as defined in claim 4, wherein said sealing flap is suspended in a swingable manner in said space.

6. A self-propelled sugar cane harvester, comprising picking means arranged to pick sugar cane; comminuting means arranged to comminute the same; first transporting means arranged to transport the comminuted sugar cane and having an outlet from which the comminuted sugar cane is discharged; second transporting means arranged to further transport the comminuted sugar cane and located near said outlet end of said first transporting means so that a stream of the comminuted sugar cane falls from said first transporting means onto said second transporting means in the region of transition between said first and second transporting means; a discharge head having inlet and outlet region; a pressure fan element located in the region of said outlet end of said first transporting means so that an air stream from said pressure fan element is directed through the comminuted sugar cane stream; an additional suction fan element arranged in said inlet region of said discharge hood so as to provide for a uniform air stream in the region of transition between said first and second transporting means; wall means arranged to form a space above said first transporting means in the region of said outlet end; and means for subdividing said space and including a sealing flap arranged in said space above said first transporting means and suspended in a swingable manner in said space, said flap being arranged so as to sense loading condition of said first transporting means and to actuate said suction fan element in dependence upon the loading condition of said first transporting means.

* * * * *